(12) United States Patent
Xu

(10) Patent No.: US 9,898,050 B2
(45) Date of Patent: Feb. 20, 2018

(54) CONNECTION DEVICE AND AN APPARATUS

(71) Applicant: Lenovo (Beijing) Co., Ltd., Beijing (CN)

(72) Inventor: Jun Xu, Beijing (CN)

(73) Assignee: LENOVO (BEIJING) CO., LTD., Haidian District, Beijing (CN)

(*) Notice: Subject to any disclaimer, the term of this patent is extended or adjusted under 35 U.S.C. 154(b) by 642 days.

(21) Appl. No.: 14/494,064

(22) Filed: Sep. 23, 2014

(65) Prior Publication Data

US 2015/0260230 A1    Sep. 17, 2015

(30) Foreign Application Priority Data

Mar. 17, 2014  (CN) .......................... 2014 1 0099472

(51) Int. Cl.
    *G06F 1/16*      (2006.01)
    *E05D 3/06*      (2006.01)

(52) U.S. Cl.
    CPC ............. *G06F 1/1681* (2013.01); *E05D 3/06* (2013.01); *Y10T 403/32418* (2015.01); *Y10T 403/7117* (2015.01)

(58) Field of Classification Search
    CPC ..... E05D 3/06; E05D 3/12; E05D 3/18; E06F 1/1681; Y10T 403/32213;
    (Continued)

(56) References Cited

U.S. PATENT DOCUMENTS 7,512,426 B2 * 3/2009 Maatta ................ H04M 1/0218
                                                    16/354
7,967,114 B2    6/2011 Csak et al.
(Continued)

FOREIGN PATENT DOCUMENTS

CN    203685838 U    7/2014
DE      1777614 U   11/1958
(Continued)

OTHER PUBLICATIONS

Office Action, and English language translation thereof, in corresponding German Application No. 102014113982.8, dated Feb. 22, 2017, 13 pages.
(Continued)

*Primary Examiner* — Josh Skroupa
(74) *Attorney, Agent, or Firm* — Brinks Gilson & Lione; G. Peter Nichols

(57) ABSTRACT

A connection device for an apparatus includes a first rotation shaft, a second rotation shaft, a synchronization bulk, and a guide bulk. The first rotation shaft includes a first synchronization section set with a first groove; the second rotation shaft is in parallel with the first rotation shaft and includes a second synchronization section set with a second groove. The synchronization bulk includes a first end, a second end disposed opposite the first end, and a position limitation section, with the first end being disposed within the first groove and capable of sliding within the first groove, the second end being disposed within the second groove and capable of sliding within the second groove; the guide bulk being set with a first containing groove, a second containing groove, and a guide groove containing groove.

9 Claims, 4 Drawing Sheets

(58) Field of Classification Search
CPC ..... Y10T 403/32254; Y10T 403/32262; Y10T 403/32409; Y10T 403/32418; Y10T 403/32598; Y10T 403/32606; Y10T 403/3906; Y10T 403/491; Y10T 403/7117; Y10T 403/7123; G06F 1/1681
USPC ........ 16/366; 403/78, 83, 84, 103, 104, 118, 403/165, 187, 188, 262, 388
See application file for complete search history.

(56) References Cited

U.S. PATENT DOCUMENTS

| | | | | |
|---|---|---|---|---|
| 8,104,144 | B2* | 1/2012 | Wang | G06F 1/1681 16/354 |
| 9,003,607 | B1* | 4/2015 | Hsu | F16H 21/44 16/366 |
| 9,185,815 | B2* | 11/2015 | Hsu | H05K 5/0226 |
| 9,265,166 | B2* | 2/2016 | Hsu | H05K 5/0226 |
| 9,388,614 | B2* | 7/2016 | Hsu | E05D 3/12 |
| 2013/0016489 | A1* | 1/2013 | Yeh | G06F 1/1681 361/807 |
| 2013/0318746 | A1* | 12/2013 | Kuramochi | G06F 1/1681 16/342 |
| 2013/0322004 | A1 | 12/2013 | Park | |
| 2014/0223693 | A1* | 8/2014 | Hsu | G06F 1/1681 16/282 |

FOREIGN PATENT DOCUMENTS

| | | |
|---|---|---|
| DE | 2159024 A | 5/1973 |
| DE | 2418254 A | 10/1975 |
| GB | 469841 A | 8/1937 |

OTHER PUBLICATIONS

Office Action, and English translation thereof, in corresponding Chinese Application No. 201410099472.7, dated Feb. 22, 2017, 12 pages.

* cited by examiner

CONNECTION DEVICE AND AN APPARATUS

This application claims priority to Chinese patent application No. 201410099472.7 filed on Mar. 17, 2014, the entire contents of which are incorporated herein by reference.

BACKGROUND

The present disclosure relates to the technical field of connecting mechanism techniques, and more particularly, to a connection device and an apparatus.

Existing apparatus usually includes two bodies and a connection device that connects the two bodies. The two bodies may be a cover body and a main body of a notebook, and may also be two bodies that entail being connected rotatably on a mechanical apparatus or a digital control apparatus.

In order to realize synchronous rotation of the two bodies that are connected, the connection device is usually provided with two rotation shafts, but in the process of implementing the technical solutions, the inventor of the present application finds out that the above related art at least has the following technical problem.

In the process of utilization, it is found out that during the rotation of the two rotation shafts, it is easy to get stuck between the rotation shafts and the guide wheel, which results in that rotation of the rotation shafts is not smooth.

SUMMARY

The present application provides a connecting apparatus and an apparatus, to solve the technical problem that during the rotation of the two rotation shafts, it is easy to get stuck between the rotation shafts and the guide wheel, which results in that rotation of the rotation shafts is not smooth.

The present application provides a connection device, comprising: a guide bulk; a first rotation shaft rotatably received in the guide bulk; a second rotation shaft rotatably received in the guide bulk; a synchronization bulk movably received in the guide bulk and slidably clamped between the first rotation shaft and the second rotation shaft to cause the first rotation shaft and the second rotation shaft to rotate synchronously.

The present application further provides an apparatus, comprising a first body, a second body, and a connection device; the connection device being configured to connect the first body and the second body and including: a guide bulk; a first rotation shaft fixed on the first body and rotatably received in the guide bulk; a second rotation shaft disposed in parallel with the first rotation shaft, fixed on the second body, and rotatably received in the guide bulk; a synchronization bulk movably received in the guide bulk and slidably clamped between the first rotation shaft and the second rotation shaft to cause the first rotation shaft and the second rotation shaft to rotate synchronously.

BRIEF DESCRIPTION OF THE DRAWINGS

In order to more clearly explain the technical solutions in the embodiments of the present disclosure or in the related art, drawings necessary for descriptions of the embodiments thereof will be introduced briefly, obviously, the drawings described below are merely some embodiments of the present disclosure.

DETAILED DESCRIPTION

With a connecting apparatus and an apparatus being provided, the embodiments of the present application solve the technical problem that during the rotation of the two rotation shafts, it is easy to get stuck between the rotation shafts and the guide wheel, which results in that rotation of the rotation shafts is not smooth.

To solve the above technical solution, the technical solutions in the embodiments of the present application have the general concept as follows:

A connection device, comprising: a first rotation shaft, a second rotation shaft, a synchronization bulk, and a guide bulk; the first rotation shaft including a first synchronization section set with a first groove; the second rotation shaft being disposed in parallel with the first rotation shaft and including a second synchronization section set with a second groove; the synchronization bulk including a first end, a second end disposed opposite the first end, and an position limitation section that connects the first end and the second end, the first end being disposed within the first groove and capable of sliding within the first groove, the second end being disposed within the second groove and capable of sliding within the second groove; the guide bulk being set with a first containing groove configured to contain the first synchronization section, and a second containing groove configured to contain the second synchronization section, and a guide groove located between the first containing groove and the second containing groove and configured to contain the position limitation section; wherein when the first rotation shaft and the second rotation shaft rotate, the first end of the synchronization bulk slides within the first groove, the second end of the synchronization bulk slides within the second groove, and the position limitation section slides within the guide groove, to cause the first rotation shaft and the second rotation shaft to rotate synchronously.

To better understand the above technical solutions, hereinafter, the above technical solutions will be described in detail in conjunction with the drawings and the specific implementations of the specification.

Figure 1:
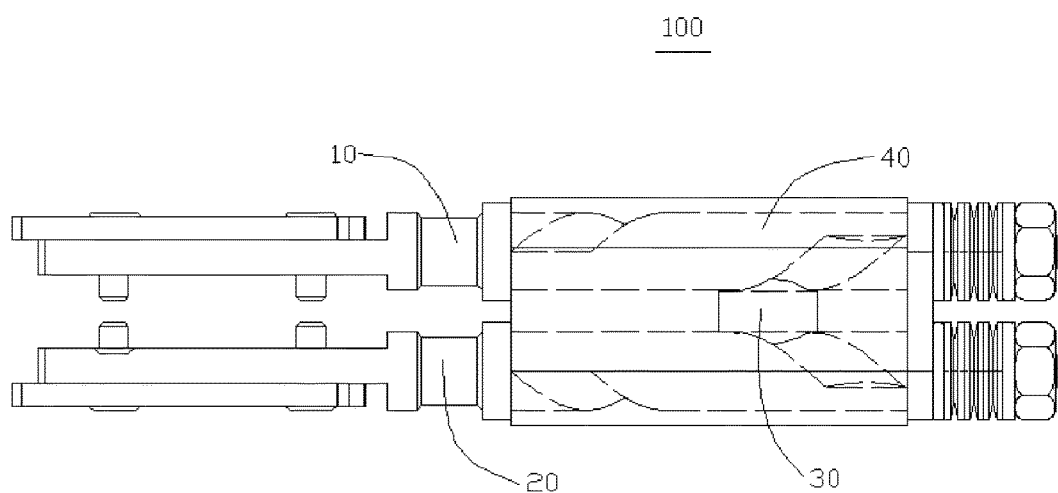
FIG. 1 is a schematic diagram of structure of a connection device according to a preferable embodiment of the present application.

As shown in FIG. 1, it is a schematic diagram of structure of a connection device 100 according to a preferable embodiment of the present application. The connection device may be used to connect two bodies. The two bodies may be a cover body and a main body of a notebook, and may also be two bodies that entail being connected rotatably on a mechanical apparatus or a digital control apparatus. In the meantime, referring to FIG. 2, the connection device 100 includes a first rotation shaft 10, a second rotation shaft 20, a synchronization bulk 30, and a guide bulk 40.

The first rotation shaft 10 includes a first synchronization section 11 set with a first groove 111, a spiral pitch of the first groove 111 may be set as needed. Further, in order to facilitate the fixing of the first rotation shaft 10, the first rotation shaft 10 further includes a first fixing section 12 connected with an end of the first synchronization section 11 and configured to fix the first rotation shaft 10. The first rotation shaft 10 is fixed on a body by setting the first fixing section 12 on the first rotation shaft 10.

The second rotation shaft 20 is disposed in parallel with the first rotation shaft 10 and includes a second synchronization section 22 set with a second groove 222, the second groove 222 has a spiral pitch the same as that of the first groove 111 and a thread direction opposite that of the first groove 111. Further, in order to facilitate the fixing of the second rotation shaft 20, the second rotation shaft 20 further includes a second fixing section 23 connected with an end of the second synchronization section 22 and configured to fix the second rotation shaft 20. The second rotation shaft 20 is fixed on a body by setting the second fixing section 23 on the second rotation shaft 20.

Specifically, headedness of the first groove 111 in the rotation shaft 10 is opposite to that of the second groove 222 in the second rotation shaft 20, the first groove 111 and the second groove 222 are symmetrical with respect to a straight line parallel to the first rotation shaft 10. In particular, the first groove 111 and second groove 222 are spiral grooves, the second groove 222 has a thread direction opposite that of the first groove 111 and a spiral pitch the same as that of the first groove 111. In other embodiments, a pitch of respective segments of the first groove 111 and the second groove 222 may be different, so long as the first groove 111 and the second groove 222 are symmetrical with respect to a straight line parallel to the first rotation shaft 10. Further, the shape of the first groove 111 and the second groove 222 may vary according to needs.

Figure 3:
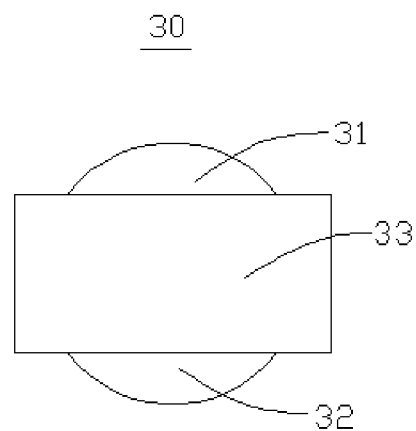
FIG. 3 is a side view of the synchronization bulk in FIG. 2.

In the meantime, referring to FIG. 3, the synchronization bulk 30 includes a first end 31, a second end 32 disposed opposite the first end 31, and an position limitation section 33 that connects the first end 31 and the second end 32, the first end 31 being disposed within the first groove 111 and capable of sliding within the first groove 111, the second end 32 being disposed within the second groove 222 and capable of sliding within the second groove 222. Specifically, the shape of the first end 31 and the second end 32 match the shape of the first groove 111 and second groove 222.

Figure 4:
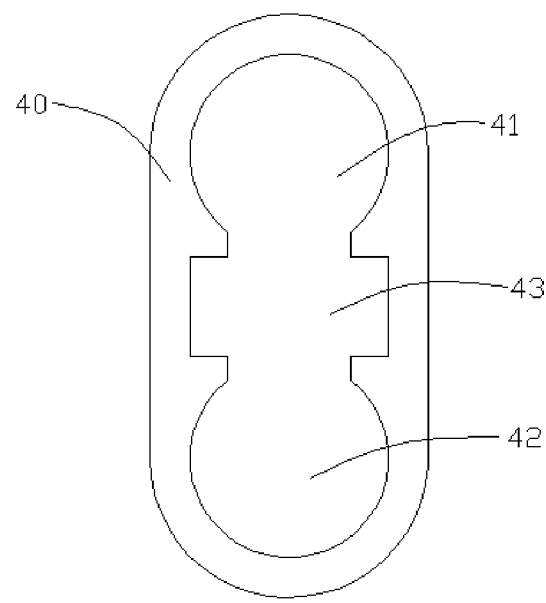
FIG. 4 is a side view of the guide bulk in FIG. 2.

As shown in FIG. 4, the guide bulk 40 is set with a first containing groove 41 configured to contain the first synchronization section 11, a second containing groove 42 configured to contain the second synchronization section 22, and a guide groove 43 located between the first containing groove 41 and the second containing groove 42 and configured to contain the position limitation section 33. The guide groove 43 is connected with the first containing groove 41 and the second containing groove 42. The first synchronization section 11 of the first rotation shaft 10 can rotate within the first containing groove 41, the second synchronization section 22 of the second rotation shaft 20 can rotate within the second containing groove 42, the position limitation section 33 can move within the guide groove 43, that is to say, the guide groove 43 is configured to limit a movement direction of the position limitation section 33.

When the first rotation shaft 10 and the second rotation shaft 20 rotate, the first rotation shaft 10 rotates within the first containing groove 41, the second rotation shaft 20 rotates within the second containing groove 42, the first end 31 of the synchronization bulk 30 slides within the first groove 111, the second end 32 of the synchronization bulk 30 slides within the second groove 222, and the position limitation section 33 slides within the guide groove 43, to cause the first rotation shaft 10 and the second rotation shaft 20 to rotate synchronously.

By means of setting, on the guide bulk 40, the first containing groove 41 configured to contain the first synchronization section 11, the second containing groove 42 configured to contain the second synchronization section 22, and the guide groove 43 that connects the first containing groove 41 and the second containing groove 42 and configured to contain the position limitation section 33 that connects two ends on the synchronization bulk 30, the above connection device 100 enables that, when the first rotation shaft 10 and the second rotation shaft 20 rotate, the first rotation shaft 10 rotates within the first containing groove 41, the second rotation shaft 20 rotates within the second containing groove 42, the first end 31 of the synchronization bulk 30 slides within the first groove 111, the second end 32 of the synchronization bulk 30 slides within the second groove 222, to cause the first rotation shaft 10 and the second rotation shaft 20 to rotate synchronously, the position limitation section 33 moves within the guide groove 43 to limit a movement direction of the position limitation section 33, which prevents the rotation shafts and the synchronization bulk 30 from getting stuck, thereby solves the technical problem that during the rotation of the two rotation shafts, it is easy to get stuck between the rotation shafts and the guide wheel, which results in that rotation of the rotation shafts is not smooth.

Specifically, a length of the guide bulk 40 in an axial direction of the first rotation shaft 10 is equal to lengths of the first groove 111 and the second groove 222 in the axial direction of the first rotation shaft 10.

Further, the first rotation shaft 10 further includes a first arrest section 13 located at an end of the first synchronization section 11, the first arrest section 13 is located between the first synchronization section 11 and the first fixing section 12. The second rotation shaft 20 further includes a second arrest section 24 located at an end of the second synchronization section 22, the connection device 100 further comprises an arrest member 50, when the guide bulk 40 is sleeved on the first synchronization section 11 and the second synchronization section 22 and arrests upon the first arrest section 13 and the second arrest section 24, the arrest member 50 is fixed on the first rotation shaft 10 and the second rotation shaft 20, so that the guide bulk 40 is fixed between the first arrest section 13, the second arrest section 14 and the arrest member 50, to prevent a separation between the guide bulk 40 and the first rotation shaft 10, the second rotation shaft 20.

By setting the arrest member 50, setting the first arrest section 13 on the first rotation shaft 10 and the second arrest section 24 on the second rotation shaft 20, when the guide bulk 40 is sleeved on the first synchronization section 11 and the second synchronization section 22 and arrests upon the first arrest section 13 and the second arrest section 24, the arrest member 50 is fixed on the first rotation shaft 10 and the second rotation shaft 20 to cause that the guide bulk 40 to be fixed between the first arrest section 13 and the second arrest section 24, the arrest member 50, thus preventing a separation between the guide bulk 40 and the first rotation shaft 10, the second rotation shaft 20.

By means of setting, on the guide bulk 40, the first containing groove 41 configured to contain the first synchronization section 11, the second containing groove 42 configured to contain the second synchronization section 22, and the guide groove 43 that connects the first containing groove 41 and the second containing groove 42 and configured to contain the position limitation section 33 that connects the two ends on the synchronization bulk 30, the above connection device 100 enables that, when the first rotation shaft 10 and the second rotation shaft 20 rotate, the first rotation shaft 10 rotates within the first containing groove 41, the second rotation shaft 20 rotates within the second containing groove 42, the first end 31 of the synchronization bulk 30 slides within the first groove 111, the second end 32 of the synchronization bulk 30 slides within the second groove 222, to cause the first rotation shaft and the second rotation shaft to rotate synchronously, the position limitation section 33 moves within the guide groove 43 to limit a movement direction of the position limitation section 33, which prevents the rotation shafts and the synchronization bulk from getting stuck, thereby solves the technical problem that during the rotation of the two rotation shafts, it is easy to get stuck between the rotation shafts and the guide wheel, which results in that rotation of the rotation shafts is not smooth.

Figure 5:
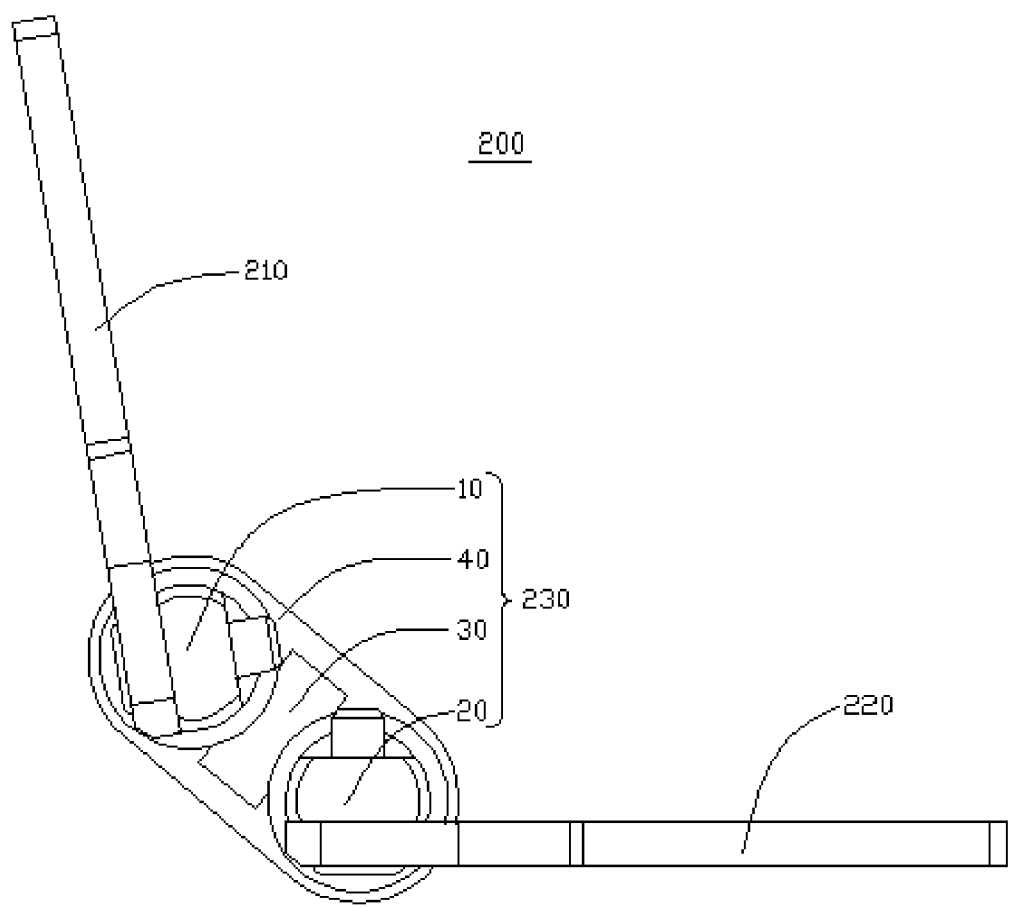
FIG. 5 is a schematic diagram of structure of an apparatus according to another preferable embodiment of the present application.

Based on the same inventive concept, the present application further provides an apparatus, which may be an electronic device, or a mechanical device and so on. FIG. 5 shows a schematic diagram of structure of an apparatus 200 according to another preferable embodiment of the present application. The apparatus 200 comprises a first body 210, a second body 220, and a connection device 220 configured to connect the first body 210 and the second body 220. The structure and function of the connection device 230 are the same as those of the connection device 100 described above so further details are not provided.

Figure 2:
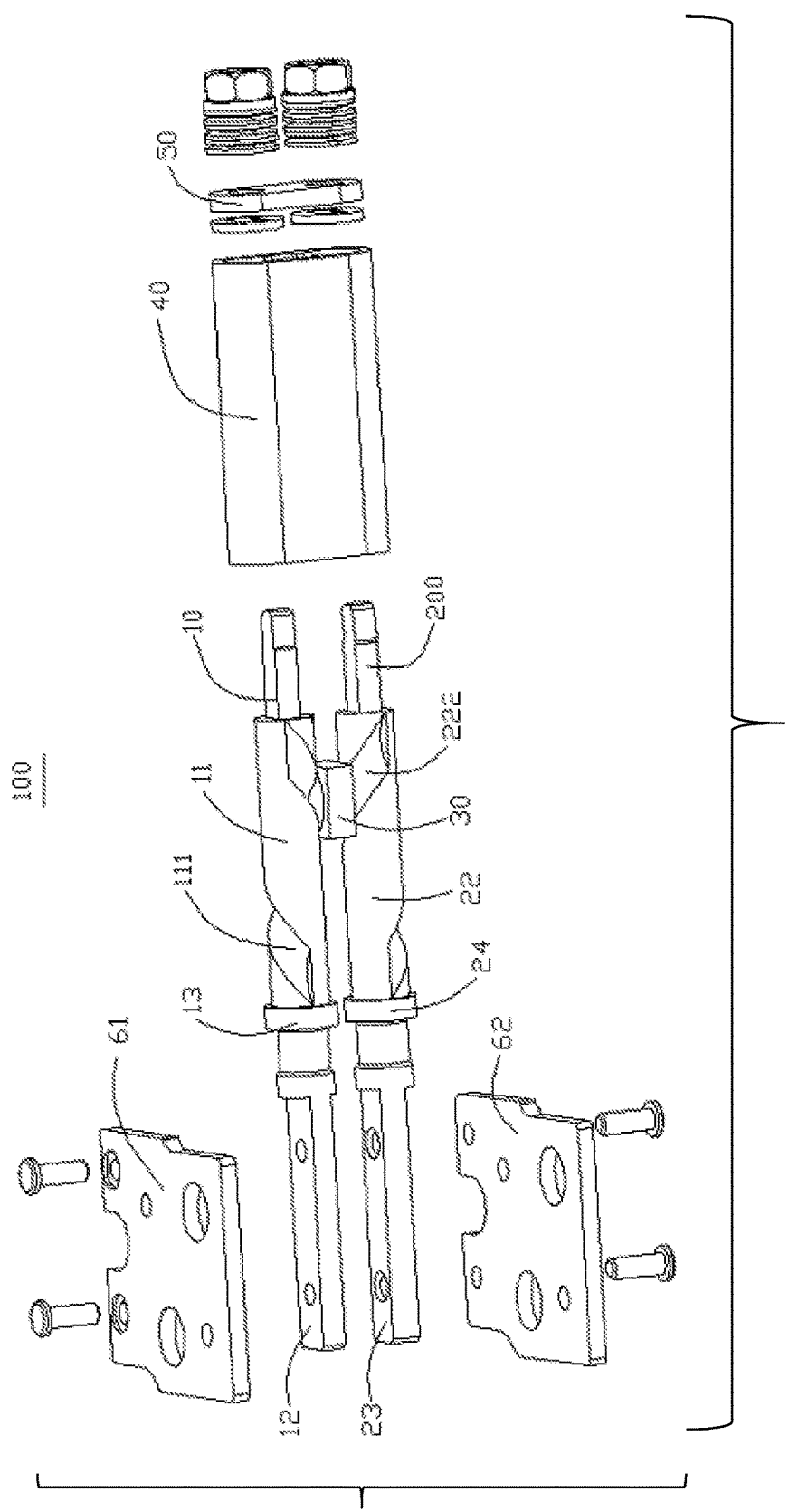
FIG. 2 is an exploded view of the connection device in FIG. 1.

In the meantime, referring to FIG. 2, the first rotation shaft 10 may be directly fixed on the first body 210, or may be fixed on the first body 210 through the first fixing section 12. Similarly, the second rotation shaft 20 may be directly fixed on the second body 220, or may be fixed on the second body 220 through the second fixing section 23.

Further, the first rotation shaft 10 and the second rotation axis 20 may also be fixedly connected with the first body 210 and the second body 220 by the following ways. In particular, the apparatus 200 further comprises a first fixing member 61 that fixedly connects between the first body 210 and the first rotation shaft 10 and a second fixing member 62 that fixedly connects the second body 220 and the second rotation shaft 20. That is, the first rotation shaft 10 is fixed on the first body 210 through the first fixing member 61, the second rotation shaft 20 is fixed on the second body 220 through the second fixing member 62.

When the first rotation shaft 10 and the second rotation shaft 20 rotate, the first rotation shaft 10 rotates within the first containing groove 41, the second rotation shaft 20 rotates within the second containing groove 42, the first end 31 of the synchronization bulk 30 slides within the first groove 111, the second end 32 of the synchronization bulk 30 slides within the second groove 222, and the position limitation section 33 slides within the guide groove 43, so that the first rotation shaft 10 drives the first body 10 and the second rotation shaft 20 drive the second body 20 to rotate synchronously.

By means of setting, on the guide bulk 40, the first containing groove 41 configured to contain the first synchronization section 11, the second containing groove 42 configured to contain the second synchronization section 22, and the guide groove 43 that connects the first containing groove 41 and the second containing groove 42 and configured to contain the position limitation section 33 that connects two ends on the synchronization bulk 30, the above apparatus 200 enables that, when the first rotation shaft 10 and the second rotation shaft 20 rotate, the first rotation shaft 10 rotates within the first containing groove 41, the second rotation shaft 20 rotates within the second containing groove 42, the first end 31 of the synchronization bulk 30 slides within the first groove 111, the second end 32 of the synchronization bulk 30 slides within the second groove 222, to cause the first rotation shaft 10 and the second rotation shaft 20 to rotate synchronously, the position limitation section 33 moves within the guide groove 43 to limit a movement direction of the position limitation section 33, which prevents the rotation shafts and the synchronization bulk 30 from getting stuck, thereby solves the technical problem that during the rotation of the two rotation shafts, it is easy to get stuck between the rotation shafts and the guide wheel, which results in that rotation of the rotation shafts is not smooth.

Although preferred embodiments of the present disclosure have already been described, other variations and modifications can be made to these embodiments once a person skilled in the art is aware of the basic inventive concept. Therefore, the appended claims are intended to include the preferred embodiments as well as all of the variations and modifications that fall into the scope of the present disclosure.

Obviously, those skilled in the art may make various modifications and variations to the present disclosure without departing from the spirit and scope thereof. Thus, if such modifications and variations to the present disclosure fall into the scope of the claims of the present disclosure and the equivalent techniques thereof, then the present disclosure is also intended to include these modifications and variations.

The invention claimed is:

1. A connection device, comprising:
   a guide bulk;
   a first rotation shaft rotatably received in the guide bulk;
   a second rotation shaft rotatably received in the guide bulk;
   a synchronization bulk movably received in the guide bulk and slidably clamped between the first rotation shaft and the second rotation shaft to cause the first rotation shaft and the second rotation shaft to rotate synchronously, wherein
   the first rotation shaft includes a first synchronization section set with a first groove;
   the second rotation shaft is disposed in parallel with the first rotation shaft and includes a second synchronization section set with a second groove;
   the synchronization bulk includes a first end, a second end disposed opposite the first end, and a position limitation section that connects the first end and the second end, with the first end being disposed within the first groove and capable of sliding within the first groove, and the second end being disposed within the second groove and capable of sliding within the second groove;
   the guide bulk being set with a first containing groove configured to contain the first synchronization section, a second containing groove configured to contain the second synchronization section, and a guide groove located between the first containing groove and the second containing groove and configured to contain the position limitation section so as to limit a movement direction of the position limitation section; and
   when the first rotation shaft and the second rotation shaft rotate, the first end of the synchronization bulk slides within the first groove, the second end of the synchronization bulk slides within the second groove, and the position limitation section slides within the guide groove, to cause the first rotation shaft and the second rotation shaft to rotate synchronously, wherein a length of the guide bulk in an axial direction of the first rotation shaft is equal to a length of the first groove and to a length of the second groove in the axial direction, respectively.

2. The connection device according to claim 1, wherein the first rotation shaft further includes a first arrest section located at an end of the first synchronization section, and the second rotation shaft further includes a second arrest section located at an end of the second synchronization section, the connection device further comprises an arrest member, and when the guide bulk is sleeved on the first synchronization section and the second synchronization section and arrests upon the first arrest section and the second arrest section, the arrest member is fixed on the first rotation shaft and the second rotation shaft, so that the guide bulk is fixed between the first arrest section, the second arrest section and the arrest member.

3. The connection device according to claim 2, wherein the first rotation shaft further includes a first fixing section connected with an end of the first synchronization section and configured to fix the first rotation shaft, and the second rotation shaft further includes a second fixing section connected with an end of the second synchronization section and configured to fix the second rotation shaft.

4. The connection device according to claim 1, wherein the first groove and the second groove are spiral grooves, and the second groove has a spiral pitch the same as that of the first groove and a thread direction opposite that of the first groove.

5. An apparatus, comprising:
a first body;
a second body;
a connection device configured to connect the first body and the second body and including:
a guide bulk;
a first rotation shaft fixed on the first body and rotatably received in the guide bulk;
a second rotation shaft disposed in parallel with the first rotation shaft, fixed on the second body, and rotatably received in the guide bulk; and
a synchronization bulk movably received in the guide bulk and slidably clamped between the first rotation shaft and the second rotation shaft to cause the first rotation shaft and the second rotation shaft to rotate synchronously,
wherein
the first rotation shaft includes a first synchronization section set with a first groove;
the second rotation shaft is disposed in parallel with the first rotation shaft and includes a second synchronization section set with a second groove;
the synchronization bulk includes a first end, a second end disposed opposite the first end, and a position limitation section that connects the first end and the second end, the first end being disposed within the first groove and capable of sliding within the first groove, the second end being disposed within the second groove and capable of sliding within the second groove;
the guide bulk being set with a first containing groove configured to contain the first synchronization section, a second containing groove configured to contain the second synchronization section, and a guide groove located between the first containing groove and the second containing groove and configured to contain the position limitation section; and
when the first rotation shaft and the second rotation shaft rotate, the first end of the synchronization bulk slides within the first groove, the second end of the synchronization bulk slides within the second groove, and the position limitation section slides within the guide groove, to cause the first rotation shaft and the second rotation shaft to rotate synchronously so as to limit a movement direction of the position limitation section,
wherein a length of the guide bulk in an axial direction of the first rotation shaft is equal to a length of the first groove and a length of the second groove in the axial direction, respectively.

6. The apparatus according to claim 5, wherein the first rotation shaft further includes a first arrest section located at an end of the first synchronization section, the second rotation shaft further includes a second arrest section located at an end of the second synchronization section, and the connection device further includes an arrest member, when the guide bulk is sleeved on the first synchronization section and the second synchronization section and arrests upon the first arrest section and the second arrest section, the arrest member is fixed on the first rotation shaft and the second rotation shaft, so that the guide bulk is fixed between the first arrest section, the second arrest section and the arrest member.

7. The apparatus according to claim 5, further comprising: a first fixing member that fixedly connects the first body and the first rotation shaft and a second fixing member that fixedly connects the second body and the second rotation shaft.

8. The apparatus according to claim 5, wherein the first rotation shaft further includes a first fixing section connected with an end of the first synchronization section and configured to fix the first rotation shaft on the first body, and the second rotation shaft further includes a second fixing section connected with an end of the second synchronization section and configured to fix the second rotation shaft on the second body.

9. The apparatus according to claim 5, wherein the first groove and the second groove are spiral grooves, and the second groove has a spiral pitch the same as that of the first groove and a thread direction opposite that of the first groove.

* * * * *